May 27, 1924.
C. A. GRASSELLI
1,495,555
PROCESS OF MAKING HYDROCHLORIC ACID AND SALT CAKE
Filed Oct. 23, 1922
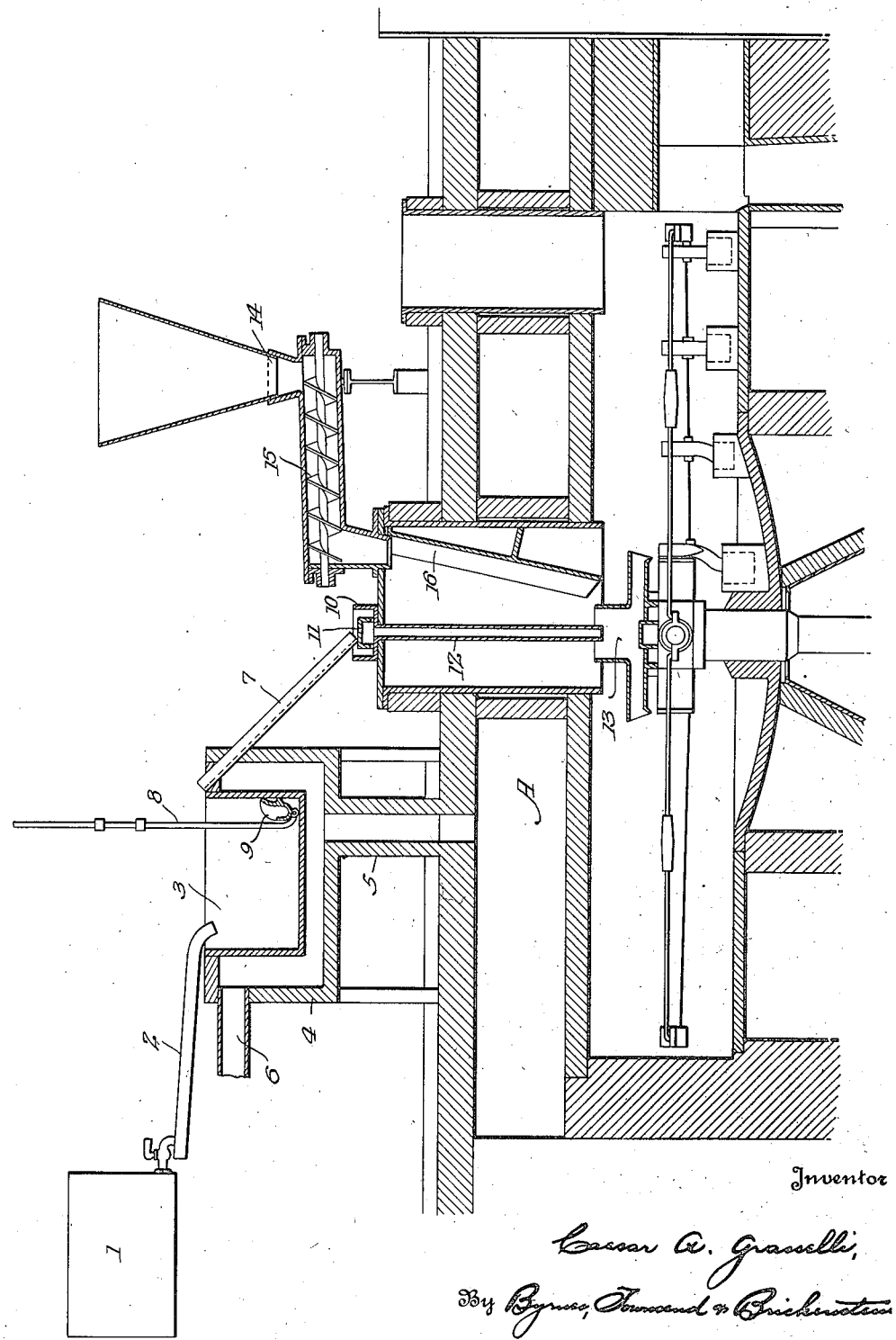
Inventor
Caesar A. Grasselli,
By Byrnes, Townsend & Crichenton
Attorneys.

Patented May 27, 1924.

1,495,555

UNITED STATES PATENT OFFICE.

CAESAR A. GRASSELLI, OF CLEVELAND, OHIO, ASSIGNOR TO THE GRASSELLI CHEMICAL COMPANY, OF CLEVELAND, OHIO, A CORPORATION OF OHIO.

PROCESS OF MAKING HYDROCHLORIC ACID AND SALT CAKE.

Application filed October 23, 1922. Serial No. 596,442.

*To all whom it may concern:*

Be it known that I, CAESAR A. GRASSELLI, a citizen of the United States, residing at Cleveland, in the county of Cuyahoga and State of Ohio, have invented certain new and useful Improvements in Processes of Making Hydrochloric Acid and Salt Cake, of which the following is a specification.

This invention relates to a process of making hydrochloric acid and salt cake, and more particularly to the procedure for handling and feeding the niter cake and salt to the salt cake furnace.

A common process for the manufacture of hydrochloric acid and salt cake consists in heating a mixture of niter cake (sodium acid sulfate produced in the manufacture of nitric acid) and salt (sodium chloride) in a suitable furnace. The process is usually carried out by crushing the niter cake, mixing it in the proper proportion with salt and feeding the mixture into the furnace. This procedure of course involves delivering the molten niter cake as it comes from the niter pots into receptacles, allowing it to cool, breaking and grinding it, and mixing it with the salt, all of which requires a considerable amount of labor and apparatus, and moreover results in the loss of the heat content of the molten niter cake.

I have found that the process may be carried out more economically and efficiently if the niter cake is fed to the salt cake furnace in molten condition, preferably as it comes from the niter pots and without cooling and remelting.

A feature of my invention therefore is the feeding of molten niter cake directly to a salt cake furnace from a source of supply.

A further feature of the invention is the regulated and continuous feeding of molten niter cake to the salt cake furnace as distinguished from batch operation. This feature involves the use of means for storing molten niter cake and keeping it in molten condition and for feeding measured quantities to the salt cake furnace.

Still a further feature of the invention is the independent and regulated feeding of salt and molten niter cake to the hearth of the salt cake furnace in proper proportions and at the desired rate in order to maintain continuous and uniform operation and the production of the maximum yields and a uniform product, particularly salt cake of uniform composition.

A further feature of the invention is the separate delivery of niter cake and salt to the salt cake furnace at closely adjacent points near the center of the pan and the mixing of the reagents in the pan.

A further feature of the invention is the saving of the heat required to melt the niter cake and particularly the avoidance of the necessity for melting the niter cake on the hearth of the salt cake furnace.

Further features of the invention will appear hereinafter.

In the following detailed description of an illustrative procedure in accordance with my invention reference is made to the accompanying drawings which illustrate one form of apparatus suitable for carrying out the process.

The apparatus illustrated is similar to that which forms the subject matter of United States Patent No. 1,370,309, issued in the name of Charles F. Guhlman on March 1, 1921.

Referring to the drawing the figure is a vertical section, parts being in elevation, of a salt cake furnace, a niter pot, means for conveying molten niter cake from the niter pot to a storage receptacle and means for feeding the molten niter cake and salt to the salt cake furnace. My invention is not concerned with the particular type of salt cake furnace employed and it is therefore to be understood that the invention is not limited to the salt cake furnace illustrated. It is further to be understood that the invention is not limited to the specific apparatus associated with the salt cake furnace or the arrangement thereof illustrated as will appear hereinafter.

On the drawing A is the salt cake furnace comprising the usual parts, that is, a hearth and means for heating it, stirring mechanism, a salt cake discharge chute, a hydrochloric acid gas exit, and means for feeding the niter cake and salt to the furnace. The niter pot 1 communicates through the conduit 2 with the molten niter cake receptacle 3 set in the chamber 4 which rests upon the top of the salt cake furnace structure and communicates through the conduit 5 with the combustion chamber of the furnace. 6 is a flue for gases passing from the combustion chamber of the furnace through conduit 5 and chamber 4. The trough 7 is designed to convey molten niter cake, emptied into it by the constant feed device 8, 9, from the receptacle 3, to the thimble 10 from which it flows under the hood 11 and through the conduit 12 into the distributor 13. The constant feed device 8, 9 comprises the vertically reciprocating rod 8 which carries on its lower end the tiltable bucket 9. Salt is fed to the salt cake furnace and delivered on to the hearth at a point in close proximity to the point at which the niter cake is delivered to the hearth by means of the hopper 14, the screw conveyor 15 and the chute 16.

The operation of the apparatus described above is as follows: Niter cake is delivered from the niter pot 1 through the conduit 2 into the receptacle 3. The niter pot 1 is not an essential part of the apparatus but merely represents a source of molten niter cake and the conduit 2 represents any suitable device for conveying molten niter cake. For instance, the niter pot 1 might be replaced by a storage tank for niter cake adapted to supply one or more salt cake furnaces and in place of the conduit 2 buckets or ladles or pots mounted on wheels might be used for delivering niter cake to receptacle 3. The niter cake in receptacle 3 is heated and maintained in a molten condition by waste hot gases coming from the combustion chamber of the salt cake furnace through the conduit 5. In this connection it is pointed out that the receptacle 3 need not be mounted upon the salt cake furnace structure and need not be heated by waste heat from the salt cake furnace, but may be independently mounted and heated. Receptacle 3 therefore, in accordance with my invention, may be any receptacle located adjacent to the salt cake furnace for storing molten niter cake and maintaining it in molten condition. The niter cake may be delivered to the receptacle 3 in molten condition as described and maintained in molten condition therein by the application of sufficient heat or the niter cake may be delivered to the receptacle 3 in solid condition and melted therein. However, for the sake of economy, I prefer an arrangement such as that illustrated, that is, an arrangement in which molten niter cake is delivered to the receptacle 3 from a suitable source such as a niter pot and maintained molten by means of waste heat which is conveniently obtained from the salt cake furnace.

The constant feeding device 8, 9 delivers molten niter cake from the storage receptacle 3 through the trough 7 to the parts 10, 11, 12 and 13 which deliver the same on to the hearth of the furnace. The constant feed device 8, 9 comprising the reciprocating rod 8 and the tiltable bucket 9 is not essential and may be replaced by any other suitable form of constant feed device. The parts 10, 11, 12 and 13 form no part of my invention and are merely suitable instrumentalities for delivering the molten niter cake to the hearth of the furnace.

The salt feeding mechanism 14, 15, 16 is merely illustrative of suitable means for delivering a constant regulated supply of salt on to the hearth of the salt cake furnace in close proximity to the point of delivery of molten niter cake to the hearth.

The molten niter cake and salt delivered on to the hearth of the furnace in proper proportions as described are mixed by the action of the stirring mechanism and heated and gradually worked toward the periphery of the hearth and finally the solid product of the reaction, salt cake, is discharged through the salt cake discharge chute, the hydrochloric acid gas formed passing through the gas exit to suitable condensing and absorbing apparatus not shown.

It will be apparent that by the use of my invention the labor and expense and the loss of heat involved in cooling molten niter cake as it comes from niter pots or other sources and then breaking and crushing it are avoided. It is also noted that my process provides for continuous and uniform operation and thus avoids breakage of the apparatus, loss of hydrochloric acid by such rapid production at times that it cannot be recovered by the apparatus used, and the production of a non-uniform salt cake and the resultant loss of either salt or niter cake. It has been found that by the use of my invention the capacity of a salt cake furnace may be increased about 60 to 70 per cent.

I claim:

1. In the process of making hydrochloric acid and salt cake by heating niter cake and salt in a salt cake furnace, the steps which consist in delivering molten niter cake from the seat of production to a storage reservoir in proximity to the salt cake furnace, maintaining said niter cake in molten condition in said reservoir, and delivering said molten niter cake from said reservoir to the salt cake furnace at a measured rate.

2. In the process of making hydrochloric acid and salt cake by heating niter cake and salt in a salt cake furnace, the steps which consist in independently and simultaneously feeding salt and molten niter cake in substantially combining proportion to the pan of the salt cake furnace.

3. Process as defined in claim 2 in which the niter cake and salt are delivered on to the pan of the salt cake furnace at points in close proximity to each other.

4. In the process of making hydrochloric acid and salt cake by heating sodium acid sulfate and salt in a salt cake furnace, the step which comprises separately and simultaneously feeding salt and molten sodium acid sulfate to the salt cake furnace.

In testimony whereof, I affix my signature.

CAESAR A. GRASSELLI.